Patented Dec. 5, 1950

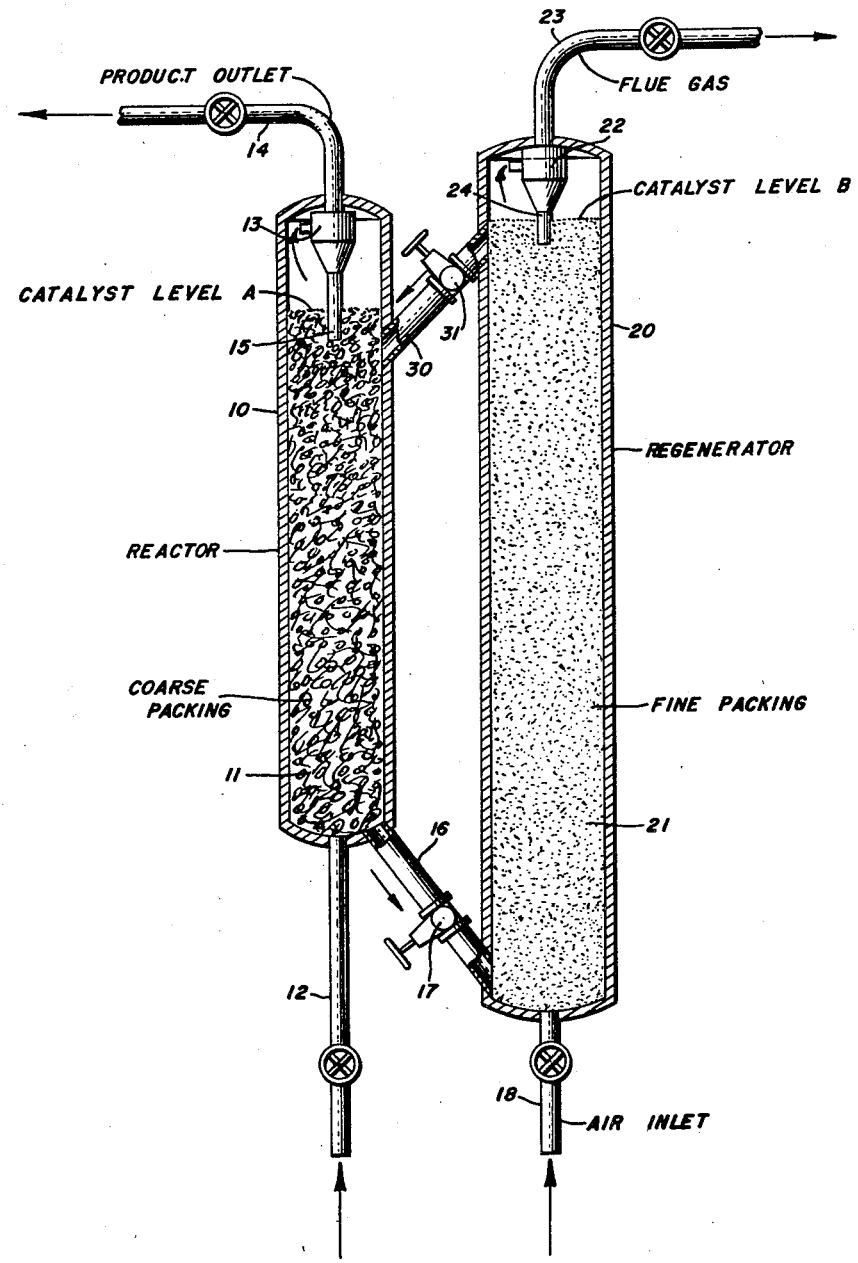

2,533,026

UNITED STATES PATENT OFFICE 2,533,026

PROCESS FOR CONTACTING SOLIDS AND GASES

George L. Matheson, Union, N. J., assignor to Standard Oil Development Company, a corporation of Delaware Application August 22, 1946, Serial No. 692,348

9 Claims. (Cl. 196—52)

The present invention relates to the contacting of subdivided solid particles and gases. It pertains more particularly to a process of, and apparatus for contacting solids with upflowing gases in which the gases pass through an enlarged contacting chamber containing a body of subdivided solids at a controlled rate to maintain the solids in a relatively turbulent, fluid ebullient state. The invention is more particularly concerned with an improved method of securing circulation of fluidized subdivided solids between the two zones and is specifically directed to an improved catalytic cracking operation.

It has, heretofore, been known in the art to contact gases and solids by passing the gases upwardly through an enlarged contacting zone containing a body of finely-divided solids to be contacted at a controlled velocity to maintain the solids in the treating zone in a quasi-liquid like state. Under properly controlled conditions, the subdivided solid particles are not only maintained in a highly turbulent, quasi-liquid state, but there exists a rapid and overall circulation of the fluidized solids throughout the fluid bed.

Processes wherein fluidized solids are contacted with gases have a number of inherent and important advantages. For example, in processes of this character intimate contact between the gases and solids is secured. It is also possible to maintain a substantially uniform temperature throughout the bed as a result of the extremely rapid transfer of heat from one section of the bed to the other because of the rapid circulation of the solids. Furthermore, due to the rapid transfer of heat between the solids under these conditions, it is possible to readily add or extract heat from the mass at an extremely rapid rate.

Fluid operations of the character described for contacting of solids and gases has found extensive application in various reduction reactions, polymerization processes, exothermic and endothermic reactions, processes for the carbonization of finely divided coal and similar operations. Specific processes in which the fluid technique has been very successfully employed are processes involving the treatment of petroleum oils, such as catalytic cracking operations, polymerization operations and the like. The fluid technique has also been successfully utilized in synthesis of hydrocarbons, such as the Fischer synthesis reactions both for the production of the synthesis gas itself and for the reaction of the oxides of carbon and hydrogen for the production of hydrocarbon constituents. Thus, while the contacting of solids and gases in a fluidized bed, as presently practiced, has found extensive application, there are certain inherent limitations in some of the processes as now practiced, which have thus far prevented its adaptation in many other fields and has limited its efficiency in many fields in which it is now employed.

In some operations for instance, the overall rapid, swirling effect obtained by the circulation of solids throughout the reaction zone is undesirable because it makes it impossible to segregate and separate from the reaction zone a stream of solids which are anything more than the average mixture of what is contained within the zone. In many cases, it is desirable to carry out the operation in truly countercurrent fashion in which the solids pass during the contacting period in a general direction countercurrent to the flow of the gas. This is particularly true when it is desired to remove spent material from the treating zone rather than an equilibrium mixture of solids contained in the zone, such as in purification and separation of gases and in the calcination and distillation of solids. Also in other operations it is of advantage to carry out the process with concurrent flow of the solids and gases. These conditions of operation are unobtainable in carrying out the contacting operation in a free, unconfined fluid bed as presently practiced. Furthermore, there is a practical limit to the depth of the fluid bed which may be used. It has been found that, if the bed is excessively deep, a surging and pounding of the bed results, leading to decreased efficiency. It is also desirable in some cases to pass the gases to be treated or contacted, successively through two separate fluidized beds in open free communication with each other. It has also been found that in carrying out the contacting of gases and solids in a fluidized bed reactor of the type described, all excess gas in addition to that which is used to fluidize the solids tends to agglomerate rapidly into large bubbles which find their way through the bed with imperfect contact with the solids.

The primary purpose of the present invention is to provide an improved method of and apparatus for carrying out the contacting of solids and gases in the presence of a fluidized bed of the type described which will not be subject to the limitations mentioned, and which will thus permit a wider application of this process. A specific object of the invention is to provide an improved method of contacting gases with a relatively deep bed of fluidized solids. Another more specific object of my invention is to provide an improved method for circulating fluidized beds of finely subdivided solid particles between two or more treating zones. My invention may be specifically applied to catalytic cracking operations. Other more specific objects and advantages of the invention will become apparent from the more specific description appearing hereinafter. The present invention will find application wherever it is desired to contact solids with gases in order to effect a physical or chemical change in either the solid or the gas, or both.

My invention finds particular application in operations in which it is desired to carry out the operations with either concurrent or countercurrent flow of the powder with respect to the gases. The present invention is directed to, and is applicable to all processes in which solids and gases are contacted and in which the gases to be treated or contacted are passed upwardly through an enlarged reaction zone containing a body of finely divided solid particles at a velocity sufficient to maintain the finely divided solid particles in a fluidized, quasi-liquid or ebullient state. My invention is applicable to operations in which the finely divided solids are continuously introduced into the reaction zone and a stream of solid particles is continuously removed therefrom, as well as, to processes in which a body of finely divided solids is continuously maintained within said zone.

In accordance with one phase of the present invention, the treating zones are filled, or partially filled, with packing or dispersing elements adequately spaced to provide a labyrinth of discontinuous passageways in which the gases are in contact with the finely divided solids which are maintained in a quasi-liquid condition. These dispersing or packing elements prevent the overall swirling or rapid circulation of the solids throughout the full length and breadth of the treating zones and also tend to break up and disperse the larger gas bubbles which tend to form. Furthermore, the presence of these dispersing or packing elements, therefore provides, among other things, more intimate and better contact between the solids and gases than would be the case where the dispersing elements are omitted. These packing and dispersing elements also prevent surging and pounding of the fluidized bed which is experienced when relatively deep, free beds are employed.

The size and character of the packing, as well as, its employment in the fluid zone, may vary appreciably. For example, the packing or dispersing elements may be dumped into the reaction or fluid zone in random fashion, or these elements may be made to assume predetermined geometric patterns. In cases where it is desired merely to avoid rapid overall recirculation of the solid particles throughout the reaction zone, the packing elements may be so spaced as to avoid extended uninterrupted horizontal flow of the gases through the reactor while permitting substantial vertical flow without interruption. Where it is desired simply to break up the formation of large bubbles of gas and thereby improve contact between the gas and solids, the packing or spacing elements may be so arranged as to prevent extended and interrupted vertical flow of the gas through the reaction zone. Maximum benefits of the invention, such as the prevention of overall floating or recirculation of the powder in the reactor, and the continuous breaking up of large gas bubbles are attained by having the packing or spacing elements so arranged as to prevent either extended and uninterrupted vertical or horizontal flow of the gases and solids through the reactor.

It has been found that, other factors being equal, the density of the fluidized mixture in the reactor will vary inversely as the size of the packing elements. For example, the larger size packing elements will produce a lower density of the fluid bed at a given velocity and for a given subdivided solid material than smaller size packing elements. Thus, it is possible in accordance with my invention to employ packing of different sizes in different treating zones and to secure a flow of fluids from one zone to the other due to a difference in fluid heads. The dimensions and the style of the packing elements utilized may also be varied appreciably, depending upon the type of reactor employed, the velocities used, the particular reaction being carried out and the character and particle size of the solids being suspended. In general, the packing may vary from a minimum dimension of ¼ inch to a maximum dimension of 12 inches or more. Packing elements of the saddle type having a maximum dimension of 1 inch to 2 inches (for example Berl saddles), are particularly suitable for most reactors. The spacing or packing elements should be shaped and arranged within the reactor so as to avoid extended horizontal surfaces on which the solid particles undergoing treatment can settle and collect.

Where the space occupied by the packing is not an important factor, the spacing elements may be in the form of solid balls, spheres, cylinders, blocks, bricks and the like. However, where it is important to provide maximum reactor space with minimum volume occupied by the packing or spacing elements, it is preferable to provide packing elements, the material of which, for a given cellular structure will occupy a minimum volume in the treating zone. These elements may, for example, be in the form of hollow cylinders, U-shaped elements resembling saddles, wire turnings or wire helices, and the like. Raschig rings preferably made of perforated metal may be used as such. When using wire helices as packing elements, it is preferred to provide burs or crimps in the wire at space points around the circumference to avoid interlocking of coils. When using saddle-shaped elements, the elements should be designed to prevent close nesting of one saddle in another.

The spacing or packing elements may be made of any desired material capable of withstanding the conditions of operation. In cases where the reactor is adapted to carry out catalytic reactions, the spacing elements may or may not have catalytic activity. The elements may also be of heat-conducting material, such as metal (for example, aluminum), or they may be made of ceramic material or other heat-insulating material in cases where it is not necessary to provide rapid heat transfer to various sections of the reaction zone.

In order to successfully maintain a quasi-liquid phase of subdivided solids and gases in the passageways between the packing elements, the subdivided solids or powder should be of such character as to be able to flow freely down through the interstices of the packing elements without becoming packed or agglomerated in the absence of an upflowing fluid. This quality of free-flowing in the interstices of the packing, in the absence of a suspending fluid, is a function of factors among which include the density of the subdivided particles, particle size, contacting zone size with respect to length as to width, and particle size distribution. Thus, the finely-divided solids used in the present invention must be of such particle size distribution as to be free-flowing without the aid of aeration. By this is meant for example, that if a body of said solids having all sides and the bottom supported, has the support on one side removed, the body will flow out that side in such a way as to leave a substantially uniformly inclined surface. As pointed out heretofore, the body is free-flowing if it will flow downwardly freely through the packing in the absence of aeration without bridging. In general, this characteristic is influenced by the content of fines in the subdivided solids having a diameter less than about 20 microns. Usually the content of such fines should not be greater than about 12% by volume since a percentage greater than this will render subdivided particles having particle size distribution in the range from about 20 microns to 200 microns non-free flowing. If the subdivided particles are free-flowing, it is possible to fluidize the subdivided particles in the interstices of the packing regardless of the relative sizes of the packing and the particle sizes of the subdivided particles providing the packing is sufficiently large to provide interstices each having a diameter greater than the diameter of the largest particle of the subdivided solids. In general, the packing should be such as to provide interstices having a length as compared to diameter of not greater than 15 to 1. It is preferred that the ratio of length as compared to diameter be in the range of 1 or 2 to 1. Also the packing should be at least about 10 times as large as the largest particle to be fluidized.

A further test of a free-flowing body is that if such a body is packed under its own weight in a 60° funnel, it will flow through the funnel freely when released at the bottom.

A further illustration of free-flowing subdivided solids in the absence of aeration with respect to its successful fluidization between the interstices of solid non-fluidized packing in a treating zone is shown by the following data. The catalyst used was a silica gel catalyst impregnated with alumina (approximately 87½% silica and 12½% alumina).

| Silica-Alumina Catalyst Micron Size | Operation A | Operation B |
| --- | --- | --- |
| 0-10 | 6.8 | 2.7 |
| 10-20 | 8.8 | 6.3 |
| 20-40 | 19.1 | 18.4 |
| 40-80 | 36.8 | 31.7 |
| 80+ | 28.5 | 40.9 |
| Free Flowing Through Interstices of Packing (No Aeration) | No | Yes |
| Successful Fluidization In Interstices of Packing | [1] No | Yes |

[1] Resulted in channeling, no fluidization of catalyst.

In these and similar operations, the reactor size with respect to length as compared to width was 15 to 1 or less. The packing comprised commercial packing of the size from ¼ to 12 inches, generally, in the range from ¼ to about 2 inches. Commercial type packings were used, such as Berl saddles. The velocity [2] of upflowing gas was in the range from about 0.1 to 1.5 feet per second. As another example, an iron catalyst having a micron size less than 44 was not free-flowing in the absence of aeration through the interstices of the packing. This iron catalyst could not be successfully fluidized in a packed zone. On the other hand, an iron catalyst having a micron size in the range from about 100 to 250 flowed freely through the interstices of the packing and could be successfully fluidized. Also, if a silica catalyst impregnated with alumina, as previously described, has a uniform micron size of about 45, it will neither flow freely between the interstices of packing, nor can it be successfully fluidized.

Whether or not small subdivided particles are free-flowing will vary with different materials and as described heretofore. However, their free-flowing characteristics in the absence of aeration may be readily determined by a simple test of the character indicated above. If a finely-divided solid material is not free-flowing it can be made so by adjusting its particle size distribution. The adjustment comprises increasing the percentage of larger size particles. A preferred catalyst comprises particles having micron sizes in the range from about 100 to about 1000 microns.

As previously mentioned, the treating zone or chamber may be completely or partially filled with packing elements while the regeneration zone may be free of packing elements or comprise packing elements of a different size. The method of positioning the packing elements both in the reaction zone and in the regeneration zone may be varied and designed to give the best results with respect to the particular reaction being carried out.

Because of the improved contact between the gases and the solids undergoing treatment obtained by the presence of the spacing or packing elements, the present invention will find application wherever fluidized beds of solids are used for effecting a physical or chemical change between either the gas or the solid, or both. However, the invention will find particular application in operations where it is desirable to pass the fluidized solids from one treating zone to another treating zone.

The invention will find particular application, for example, in such operations as the separation and purification of gases by selective adsorption of certain constituents thereof with adsorbent powder, such as in the separation of butadiene from butenes, or the separation of aromatic hydrocarbons from aliphatic hydrocarbons by selective adsorption, the drying of air, drying and calcining of various solids such as, the calcination of limestone and magnesite to form the oxides, the distillation of solids, such as coal or oil shale, the adsorption of normally liquid hydrocarbons from normally gaseous hydrocarbons and the recovery of the normally liquid hydrocarbons from the adsorbent, and many types of chemical reactions involving oxidation, chlorination, nitration, hydrogenation, dehydrogenation, polymerization and the like, in which the solid particles serve as a catalyst for the reaction.

My invention may also be specifically applied in processes wherein powdered adsorbent such as, charcoal, silica gel and the like are employed for the selective adsorption of hydrocarbons from gaseous mixtures containing the same. As for example, for the recovery of gasoline from natural gas or for the removal of ethylene from mixtures comprising ethane and the removal of ethane from mixtures comprising propylene. My invention is also applicable to processes for the

[2] Velocity in the treating zone provided no solids are present.

separation of hydrocarbon fractions having different molecular weights or different molecular structures. For example, it may be readily applied in the separation of hydrocarbon fractions averaging about one carbon atom to the molecule from hydrocarbon fractions averaging two or three carbon atoms to the molecule.

My invention will be more readily understood by reference to the data in the following table illustrating the change in bed density, measured in pounds per cubic foot, as the size of the packing and the velocity change.

*Effect of superficial velocity and different size packing on bed density*

[Packed and Unpacked Column; 400 Micron Sand with Air Aeration.]

|  | Bed Density (Lb./Cu. Ft.) | | | |
| --- | --- | --- | --- | --- |
| Superficial Velocity,[1] Ft./Sec | 1 | 2 | 3 | 4 |
| Packing Size: | | | | |
| ¼″ Berl Saddles | 43 | 30.5 | 18 | |
| ½″ Berl Saddles | 54 | 44 | 34 | 23.5 |
| 1″ Berl Saddles | 68.5 | 58 | 46.5 | 36 |
| No packing—Shallow Bed | 86 | 78 | 70.5 | 63 |

[1] Velocity in the treating zone provided no solids are present.

From the above data it is readily apparent that as the size of the packing decreases, the bed density and thus the fluid head likewise decrease. The fluid head between two respective zones can be readily calculated from the data in the above table by considering the heights of the fluid heads in the respective zones and multiplying the density by the height of the beds.

A specific adaptation of my invention is illustrated by the drawing which shows its application to a catalytic cracking operation. Referring specifically to the figure, reaction zone 10 contains relatively large size packing elements 11 while regeneration zone 20 contains relatively smaller packing elements 21. Gas oil feed vapors boiling in the range above about 400° F. and heated to the desired cracking temperature are introduced into the lower section of reaction zone 10 by means of line 12. These vapors flow upwardly through reaction zone 10 between the interstices of packing elements 11. Small subdivided catalyst particles are maintained in a fluidized condition between the interstices of packing elements 11. The top of the fluid bed is maintained at point A. After a sufficient time of contact the reactant vapors are passed through cyclone separator 13 and withdrawn from the reaction zone by means of line 14. Separated catalyst particles are returned to the catalyst bed from cyclone separator 13 by means of line 15.

In accordance with my invention, I maintain relatively small non-fluidized packing elements in regeneration zone 20. As the catalyst becomes less active it is withdrawn from the bottom of zone 10 by means of line 16, passed through slide control valve 17 and introduced into the bottom of regeneration zone 20. An oxidizing stream, as for example, air is introduced into regeneration zone 20 by means of line 18. The oxidizing gases together with the catalyst being regenerated flow concurrently upwardly between the interstices of the packing elements. The upper lever of the catalyst bed in regeneration zone 20 is maintained at point B. The gases are withdrawn from zone 20 through cyclone separator 22 and removed by means of line 23. Separated solid particles are returned to the catalyst bed from cyclone separator 22 by means of line 24. Due to the fluid head imposed by the more dense catalyst in reaction zone 10, the less dense catalyst flows upwardly through zone 20. Conditions are adjusted so that as the catalyst reaches level B in zone 20 it is substantially regenerated. At this point the catalyst is returned to reaction zone 10 through line 30 and slide control valve 31.

Although my invention has been described with respect to a catalytic cracking operation wherein countercurrent flow is employed in the reaction zone and concurrent flow is employed in the regeneration zone, it is to be understood that it may be applied to other operations or to operations in which the flow is countercurrent or concurrent in one or both zones.

By concurrent or countercurrent operation is meant the flow of suspended particles and suspending gases with respect to a fixed point in the treating zone. If both the gases and suspended particles flow in the same direction past the fixed point, the operation is concurrent with respect to gases and suspended particles. If the gases and suspended particles flow in opposite directions past the fixed point, the operation is countercurrent with respect to gases and suspended particles. If a fluid bed is maintained in the reaction zone and there is no continuous withdrawal or addition of solid particles, the operation is neither concurrent nor countercurrent, although a swirling, ebullient motion of the suspended particles is secured in the zone due to the effect of the upflowing suspending gases. In order to secure flow of the suspended fluid particles, it is necessary to suspend the particles in a suspending gas or fluid and then to impose a fluid head. The fluid head may be imposed by mechanical means, such as, pumps and blowers, by a standpipe arrangement, by employing different packing sizes and the like. For example, one method of securing countercurrent flow is to introduce the solid particles at the top of the treating zone, to suspend the particles in the fluid state by means of an upflowing suspending gas and to draw off fluid suspended particles from the bottom of the treating zone due to the fluid head imposed by the height of the fluid bed. The withdrawn fluid suspended particles are generally, recycled either directly to the top of the treating zone or to a regeneration zone and then to the top of the treating zone. Recirculation in this manner may be secured by blowing with an air stream. On the other hand, if concurrent flow is desired, the solid particles may be introduced into the gas stream and the suspended particles along with the gases introduced into the bottom of the treating zone. A fluid head may be imposed on the stream introduced into the bottom of the treating zone by mechanical means, but is generally accomplished by a standpipe arrangement. The suspended particles, along with the suspending gases are withdrawn from an upper part of the treating zone due to the imposed fluid head. Having described the preferred embodiment of my invention, it will be understood that it embraces such other variations and modifications as come within the spirit and scope thereof.

What is to be protected by Letters Patent is:

1. In a process in which finely divided solids are maintained in a fluidized state in treating zones by means of upflowing suspending fluids, the improvement which comprises maintaining relatively larger solid non-fluidized packing in said treating zones, the non-fluidized packing in one treating zone being characterized by being larger than the non-fluidized packing in the other treating zone, and causing the fluidized solids to flow from one zone to the other due to the difference in fluid head caused by the different size packing.

2. In a process wherein finely divided fluidized solids are passed from an initial treating zone to a second treating zone the improvement which comprises maintaining solid non-fluidized packing of one size in said initial treating zone and solid non-fluidized packing of a different size in said second treating zone, whereby a fluid head differential is secured between the respective zones.

3. Process as defined by claim 2 wherein said process is a catalytic cracking process, wherein said initial treating zone is a reaction zone and wherein said second treating zone is a catalyst regeneration zone.

4. Improved catalytic cracking operation which comprises introducing feed vapors into a reaction zone containing solid non-fluidized packing and also containing finely divided fluidized catalyst between the interstices of said packing, drawing reactant vapors from the reaction zone after a sufficient time of contact, withdrawing from said reaction zone spent catalyst and passing the same in a fluidized state to a regeneration zone containing solid non-fluidized packing, said packing in said regeneration zone being characterized by having a different size than said packing in said reaction zone, whereby a fluid head differential exists between said reaction zone and said regeneration zone, withdrawing regenerated catalyst from said regeneration zone and recycling the same to said reaction zone.

5. In a process for containing fluid materials with finely divided solid materials maintained in a fluidized state by said fluid materials, the improvement which comprises maintaining a plurality of substantially inert packing elements as a body of said elements in a treating zone providing thereby a plurality of irregularly interconnected, substantially discontinuous, interstitial passageways throughout a major portion of said zone, in a second treating zone, maintaining a similar body of substantially smaller packing elements providing a plurality of smaller interstitial passageways, and passing a flowing stream of finely divided solid materials, fluidized by the introduction of fluid materials into each of said treating zones, in a continuous circuit from one zone to the other under influence of a difference in the fluid head in the first zone as compared with the second zone, created by the difference in size of the packing elements and interstitial passageways in the respective zones.

6. Improved catalytic cracking operation which comprises introducing feed vapors into a reaction zone containing solid non-fluidized packing and also containing finely divided fluidized catalyst between the interstices of said packing, drawing reactant vapors from the reaction zone after a sufficient time of contact, withdrawing spent catalyst from the bottom of said reaction zone and passing the same in a fluidized state to the bottom of a regeneration zone containing a non-fluidized packing of smaller size than that in said reaction zone; whereby a fluid head differential exists between said reaction zone and regeneration zone, regenerated catalyst being withdrawn from the top of the regeneration zone and introduced into the top of said reaction zone.

7. A process for contacting gaseous materials with finely divided solid materials comprising maintaining said solid materials as a body of such materials in each of a series of at least two interconnected contacting zones, passing a gaseous material for contact with said solid materials through each zone, fluidizing said solid materials in each zone, creating a difference in fluid head between said zones by providing a packing of individual packing elements in at least one zone, said packing reducing the density of fluidized solid materials therein, passing said solid materials in a continuous circuit through said series of zones under the influence of said difference in density and fluid head, and separately withdrawing contacted fluids from each zone of said series.

8. A process according to claim 7, in which the gaseous material for contact with said solid materials is passed countercurrently to said solid materials through at least one of said zones.

9. A process according to claim 7 in which the gaseous material for contact with said solid materials is passed countercurrently to said solid materials through at least one of said zones and concurrently to said solid materials through the remaining zone or zones of the series.

GEORGE L. MATHESON.

REFERENCES CITED

The following references are of record in the file of this patent:

UNITED STATES PATENTS

| Number | Name | Date |
| --- | --- | --- |
| 2,408,600 | Berg | Oct. 1, 1946 |
| 2,425,098 | Kassel | Aug. 5, 1947 |
| 2,444,900 | Hemminger | July 13, 1948 |

FOREIGN PATENTS

| Number | Country | Date |
| --- | --- | --- |
| 574,892 | Great Britain | Jan. 24, 1946 |